(12) United States Patent
Mori et al.

(10) Patent No.: US 9,231,350 B2
(45) Date of Patent: Jan. 5, 2016

(54) CONNECTOR

(71) Applicant: YAZAKI CORPORATION, Tokyo (JP)

(72) Inventors: Shigeo Mori, Kakegawa (JP); Masayuki Kataoka, Kakegawa (JP); Fuminori Sugiyama, Kakegawa (JP); Takashi Ishihara, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/506,854

(22) Filed: Oct. 6, 2014

(65) Prior Publication Data

US 2015/0096801 A1    Apr. 9, 2015

(30) Foreign Application Priority Data

Oct. 7, 2013 (JP) ................................. 2013-209850

(51) Int. Cl.
*H01R 13/6591* (2011.01)
*H01B 17/26* (2006.01)
*H02G 3/08* (2006.01)
*H02G 3/22* (2006.01)

(52) U.S. Cl.
CPC .......... *H01R 13/6591* (2013.01); *H01B 17/265* (2013.01); *H02G 3/083* (2013.01); *H02G 3/22* (2013.01)

(58) Field of Classification Search
CPC .................................................. H01R 13/6591
See application file for complete search history.

(56) References Cited

U.S. PATENT DOCUMENTS

| | | | | |
|---|---|---|---|---|
| 2,414,143 A * | 1/1947 | Dunning | ................... | H05K 7/12 116/DIG. 35 |
| 3,957,331 A * | 5/1976 | Tantillo | ................... | H01R 39/00 219/533 |
| 4,003,616 A * | 1/1977 | Springer | ................. | H01R 39/64 174/46 |
| 5,074,796 A * | 12/1991 | Carter | ................... | H01R 13/642 439/21 |
| 6,280,208 B1 * | 8/2001 | Masuda | .................... | H01R 4/64 174/359 |
| 6,343,963 B1 * | 2/2002 | Bronk | ...................... | H01R 4/62 439/11 |
| 6,641,436 B2 * | 11/2003 | Baffert | ................. | H01R 9/0518 439/582 |
| 2006/0003629 A1 * | 1/2006 | Murphy | .................... | H01R 9/05 439/578 |
| 2013/0017719 A1 | 1/2013 | Tanaka et al. | | |
| 2013/0168150 A1 * | 7/2013 | Sakakura | ................. | H02G 3/22 174/650 |
| 2014/0030921 A1 * | 1/2014 | Kobayashi | ......... | H01R 13/6591 439/607.01 |
| 2014/0080355 A1 * | 3/2014 | Wang | .................... | H01R 13/641 439/573 |
| 2015/0096801 A1 * | 4/2015 | Mori | .................... | H01B 17/265 174/653 |
| 2015/0126055 A1 * | 5/2015 | Morita | ............... | H01R 13/5202 439/323 |

FOREIGN PATENT DOCUMENTS

JP       2012-151067 A       8/2012

* cited by examiner

*Primary Examiner* — James Harvey
(74) *Attorney, Agent, or Firm* — Sughrue Mion, PLLC

(57) ABSTRACT

A connector includes a cylindrical-shaped housing inserting therein a wire, a shield shell disposed on an outer side of the housing, and a mounting member assembled with the housing and the shield shell. The mounting member includes a tubular portion inserted into a gap between the housing and the shield shell in a diameter direction of the housing and contacted with an end face of the housing. The shield shell includes a fixing portion fixed to the housing and a movable portion rotatably connected to the fixing portion. A fixing mechanism is provided between the movable portion and the tubular portion, moves the end face toward the tubular portion when the movable portion is rotated, and fixes the housing and the shield shell to the mounting member when the tubular portion and the end face closely contacted with each other.

3 Claims, 5 Drawing Sheets

CONNECTOR

BACKGROUND

The invention relates to a connector.

Conventionally, there is known a connector which includes a cylindrical-shaped housing for receiving therein a wire having a terminal in its terminal portion, a shield shell to be disposed on the outer peripheral side of the housing, and a mounting member to which the housing and shield shell can be assembled and in which the terminal can be disposed (for example, the patent document 1).

In this connector, to secure its waterproof property, seal members are interposed respectively between the housing and wire, between the housing and terminal, and between the housing and mounting member. Also, to the housing, there is assembled a rear holder in order to prevent the removal of the seal member interposed between the housing and wire.

Further, to the outer periphery of the housing, there is assembled a shield shell in order to secure the shield property of electromagnetic waves. This shield shell is fixed to the mounting member through a bolt to be fastened by a tool such as a bolt fastening tool.

[Patent Document 1] Japanese Patent Publication No. 2012-151067

SUMMARY

It is one advantageous aspect of the present invention to provide a connector which, while securing a waterproof property, can reduce the number of parts, can realize size reduction and can enhance the assembling property.

According to one aspect of the invention, there is provided a connector, comprising:

a housing having a cylindrical shape and configured to insert therein a wire which has a terminal at a terminal portion of the wire;

a shield shell disposed on an outer peripheral side of the housing;

a mounting member configured to be assembled with the housing and the shield shell and to set the terminal therein; and a fixing mechanism, wherein the mounting member includes a tubular portion configured to be inserted into a gap between the housing and the shield shell in a diameter direction of the housing and to be contacted with an end face of the housing, the shield shell includes a fixing portion configured to be fixed to the housing, and a movable portion rotatably connected to the fixing portion and disposed on an outer periphery of the tubular portion, the housing is molded integrally with the fixing portion and the wire by an insulating resin, and the fixing mechanism is provided between the movable portion and the tubular portion in the diameter direction, is configured to move the end face of the housing toward the tubular portion when the movable portion is rotated, and is configured to fix the housing and the shield shell to the mounting member in a state where the tubular portion and the end face of the housing closely contacted with each other.

The fixing mechanism may include a screw portion.

The fixing mechanism may include a projection provided on one of the movable portion and the tubular portion, and a groove section formed in the other one of the movable portion and the tubular portion and configured to be engaged with the projection.

DETAILED DESCRIPTION OF EXEMPLIFIED EMBODIMENTS

Figure 1:
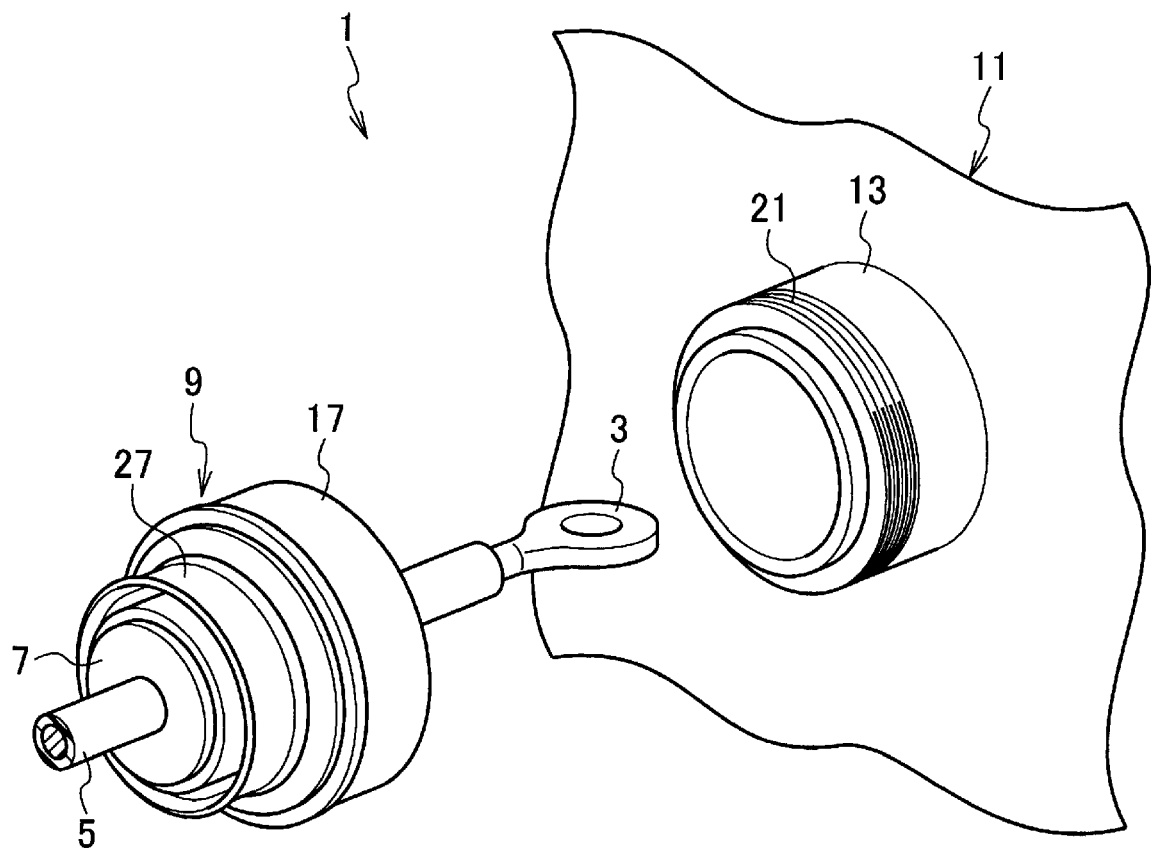
FIG. 1 is an exploded perspective view of a connector according to a first embodiment of the invention.
Figure 2:
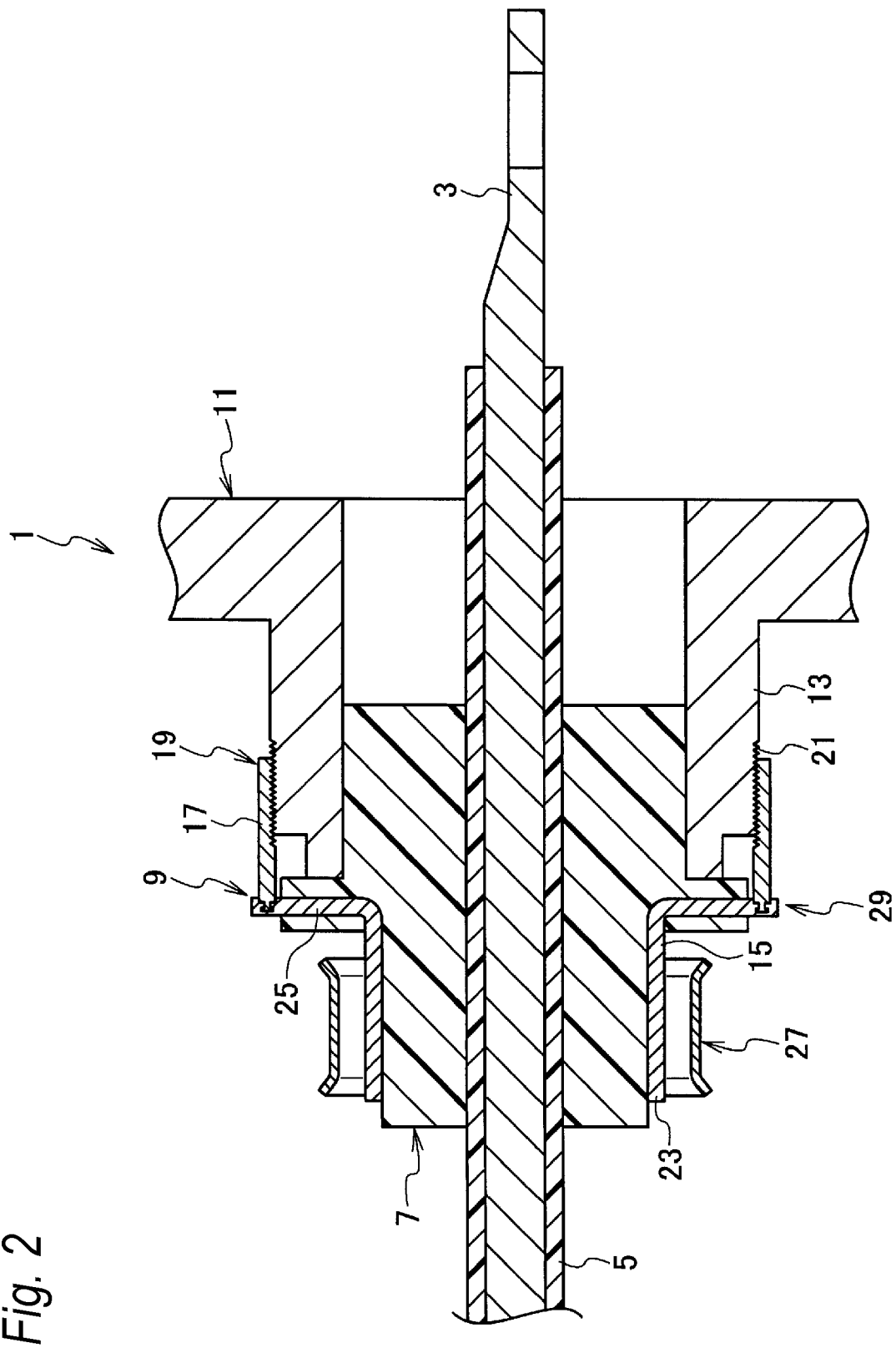
FIG. 2 is a section view of the connector of the first embodiment of the invention.
Figure 3:
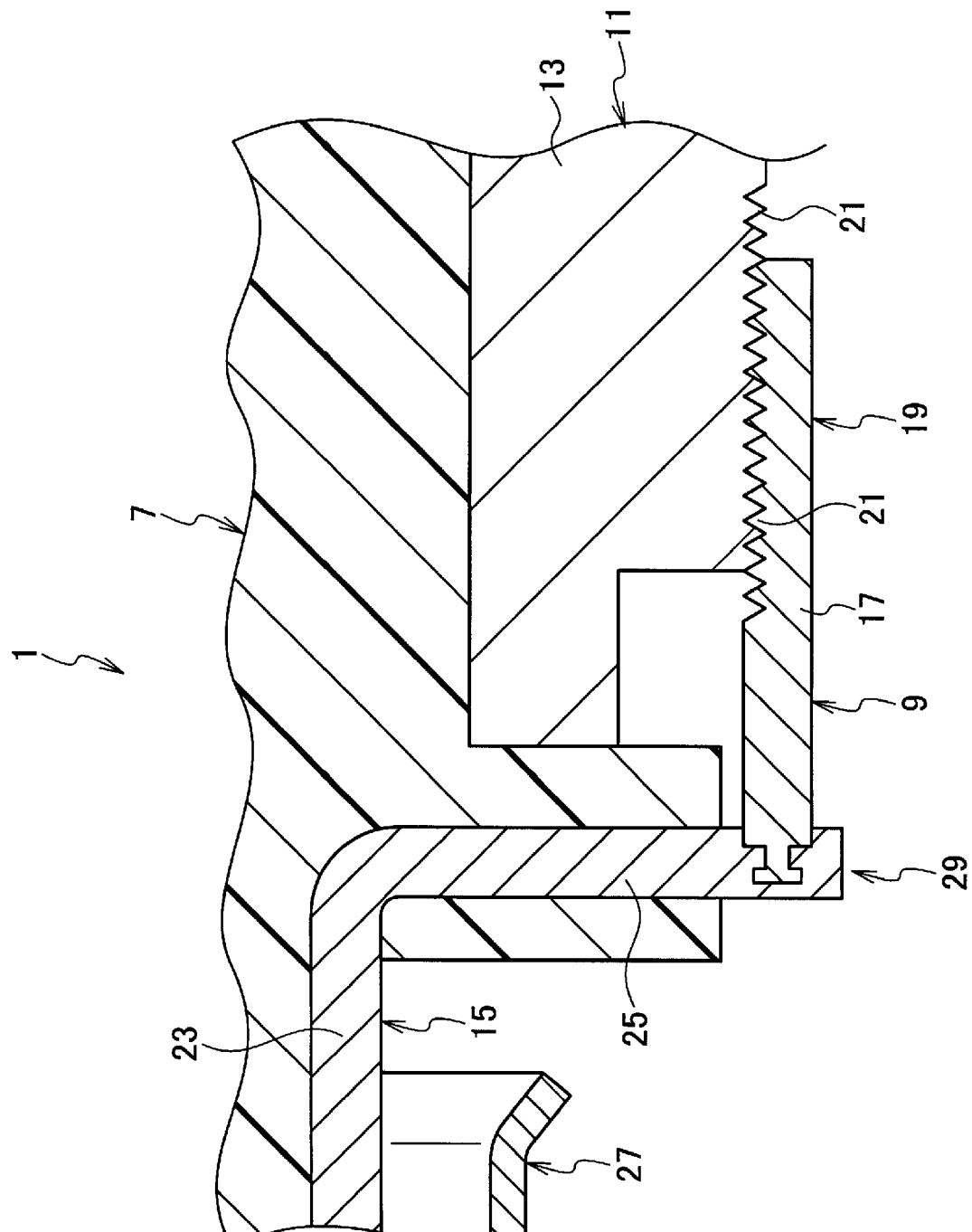
FIG. 3 is a section view of the main portions of the connector of the first embodiment of the invention.
Figure 4:
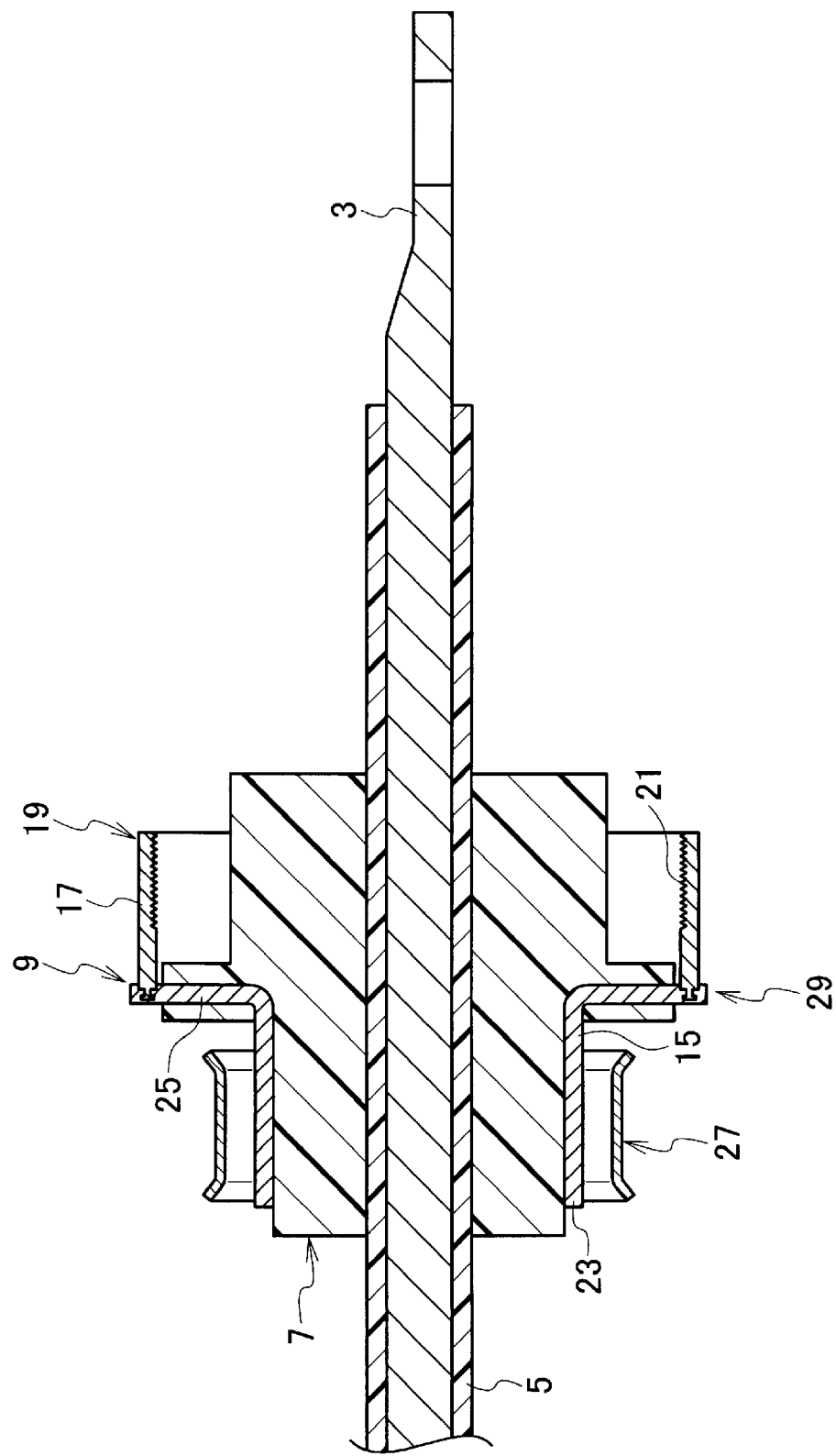
FIG. 4 is a section view of the connector of the first embodiment of the invention, showing a state where the housing is molded.

In the connector as disclosed in the patent document 1, in order to secure the respective functions such as waterproof property and shield property, the number of parts is very large, which causes the lowered assembling property and increased cost. In addition, spaces for arranging the respective parts must be secured, which makes it difficult to reduce the size of the connector.

Also, since the shield shell is fixed to the mounting member through the bolt, an arranging space for a tool such as a bolt fastening tool must be secured, which further makes it difficult to reduce the size of the connector. And, since multiple bolts must be fastened, the assembling property of the connector is further lowered.

Thus, one of objects of the invention is to provide a connector which, while securing a waterproof property, can reduce the number of parts, can realize size reduction and can enhance the assembling property.

Description is given of a connector according to the embodiments of the invention using FIGS. 1 to 5.

First Embodiment

Description is given of the first embodiment using FIGS. 1 to 4.

A connector 1 according to this embodiment includes a cylindrical-shaped housing 7 for receiving therein a wire 5 having a terminal 3 in its terminal portion, a shield shell 9 to be disposed on the outer peripheral side of the housing 7, and a mounting member 11 to which the housing 7 and shield shell 9 can be assembled and in which the terminal 3 can be disposed.

The mounting member 11 includes a tubular portion 13 which can be inserted between the housing 7 and shield shell 9 in the diameter direction and thus can be contacted with the end face of the housing 7.

The shield shell 9 includes a fixing portion 15 to be fixed to the housing 7 and a movable portion 17 which is rotatably connected to the fixing portion 15 and is disposed on the outer periphery of the tubular portion 13 of the mounting member 11.

The housing 7 is molded integrally with the fixing portion 15 of the shield shell 9 and wire 5 out of insulating resin and, between the movable portion 17 of the shield shell 9 and the tubular portion of the housing 7 in the diameter direction, there is interposed a fixing mechanism 19 which rotates the movable portion 17 to thereby move the end face of the housing 7 toward the tubular portion 13 by the rotation of the movable portion to thereby bring the tubular portion 13 and, with the tubular portion 13 and the end face of the housing 7 closely contacted with each other, fixes the housing 7 and shield shell 9 to the mounting member 11.

The fixing mechanism 19 is constituted of a screw section 21.

As shown in FIGS. 1 to 4, the housing 7 is formed of insulating synthetic resin material into a cylindrical shape. Into the housing 7, there is inserted the wire 5 with the terminal 3 connected to its terminal portion and the outer periphery of the wire 5 is covered with a shield member (not shown) such as a braided wire. Thus, noises and the like can be prevented against invasion into or leakage from the housing.

This housing 7 is formed as follows. That is, with the shield shell 9 arranged on the outer periphery of the wire 5, the housing 7 is molded integrally with the wire 5 and the fixing portion 15 of the shield shell 9 out of insulating resin used as housing material into a cylindrical shape.

The shield shell 9 is made of conductive material and includes the fixing portion 15 and movable portion 17. The fixing portion 15 includes a tubular section 23 and a flange section 25.

The tubular section 23 is disposed on the wire 5 pull-out side outer periphery of the housing 7. On the outer periphery of the tubular section 23, there is disposed the terminal portion of a shield member to be set on the outer periphery of the wire 5. By staking a ring 27, the shield shell 9 and shield member are electrically connected to each other, thereby making a shield circuit for preventing noises or the like from invading into or leaking from the wire 5.

The flange section 25 is made of a single member which continues with the tubular section 23 and extends outwardly in the diameter direction from the end of the tubular section 23. The flange section 25, when molding the housing 7, is molded of insulating resin into the housing 7 to fix the shield shell 9 to the housing 7 tightly with no clearance between them.

On the outside diameter side of the flange section 25, there is formed a groove extending continuously in the peripheral direction. This groove cooperates with a projection engageable with a groove formed in the movable portion 17 to constitute a connecting portion 29. The movable portion 17 is rotatably connected to the fixing portion 15 through the connecting portion 29.

The movable portion 17 is formed in a cylindrical shape and is connected to the flange section 25 of the fixing portion 15 through the connecting portion 29 in such a manner that it can be rotated relative to the outer periphery of the housing 7. The tubular portion 13 of the mounting member 11 is inserted between the movable portion 17 and housing 7 in the diameter direction.

The mounting member 11 is constituted of a case in which equipment connectable by the terminal 3, a power supply and the like can be stored and includes, in its wall portion, a tubular portion 13 which is in communication with the interior of the case and is projected outwardly. The tubular portion 13, when assembling the housing 7 and shield shell 9 to the mounting member 11, is inserted between the movable portion 17 of the shield shell 9 and housing 7 in the diameter direction and is closely contacted with the end face of the housing 7 where the flange section 25 of the fixing portion 15 of the shield shell 9 has been molded.

With the housing 7 and shield shell 9 assembled to the tubular portion 13 in this manner, the terminal 3 connected to the wire 5 is disposed on the interior side of the mounting member 11, whereby the terminal 3 can be electrically connected to the equipment, power supply and the like.

Between the tubular portion 13 and the movable portion 17 of the shield shell 9 disposed on the outer peripheral side of the tubular portion 13 in the diameter direction in this manner, there is interposed a fixing mechanism 19 for fixing the housing 7 and shield shell 9 to the mounting member 11.

The fixing mechanism 19 is constituted of screw sections 21 respectively formed on the outer peripheral surface of the tubular portion 13 and the inner peripheral surface of the movable portion 17. With the tubular portion 13 of the mounting member 11 inserted between the movable portion 17 of the shield shell 9 and housing 7 in the diameter direction, the fixing mechanism 19 rotates the movable portion 17 along the peripheral direction of the tubular portion 13 to thereby move the fixing portion 15 existing end face of the housing 7 toward the end face of the tubular portion 13, while it rotates the movable portion 17 until the end face of the tubular portion 13 and the fixing portion 15 existing end face of the housing 7 are closely contacted with each other with no clearance between them, before completing its fixing operation.

In the fixed state attained by the fixing mechanism 19, since the end face of the tubular portion 13 and the fixing portion 15 existing end face of the housing 7 are closely contacted with each other with no clearance between them, it is not necessary to provide a seal member for sealing between the housing 7 and mounting member 11.

In addition, since the fixing mechanism 19 is constituted of the screw sections 21, there can be obtained a fixing strength equivalent to a structure for fastening multiple bolts, which can fix the housing 7 and shield shell 9 to the mounting member 11 stably.

In the connector 1, since the housing 7 is molded integrally with the fixing portion 15 of the shield shell 9 and wire 5 out of the insulating resin material, a seal member to be interposed between the housing 7 and wire 5 can be omitted, thereby being able to secure a waterproof property between the housing 7 and wire 5. In addition, a space for the seal member can be reduced, thereby being able to reduce the size of the connector 1.

Also, between the movable portion 17 of the shield shell 9 and the tubular portion 13 of the mounting member 11 in the diameter direction, there is interposed the fixing mechanism 19 which rotates the movable portion 17 to thereby move the end face of the housing 7 toward the tubular portion 13 and, with the tubular portion 13 and the end face of the housing 7 closely contacted with each other, fixes the housing 7 and shield shell 9 to the mounting member 11.

Thus, when fixing the shield shell 9 to the mounting member 11, there can be omitted a bolt fastening operation which uses bolts to be provided as separate members, which can further reduce the number of parts and enhance the assembling property. In addition, there can be reduced the space for arranging a tool such as a bolt fastening tool, thereby being able to reduce the size of the connector 1 further.

Also, since the fixing mechanism 19 fixes the housing 7 and shield shell 9 to the mounting member 11 with the tubular portion 13 and the end face of the housing 7 closely contacted with each other, there can be reduced a seal member to be interposed between the housing 7 and mounting member 11, thereby being able to secure a waterproof property between the housing 7 and mounting member 11.

Therefore, the connector 1, due to the molding of the housing 7 and the provision of the fixing mechanism 19, while securing the waterproof property, can reduce the number of parts, can reduce the size and can enhance the assembling property.

Also, since the fixing mechanism 19 is constituted of the screw sections 21, by rotating the movable portion 17 of the shield shell 9, the housing 7 and shield shell 9 can be fixed to the mounting member 11, whereby, while reducing the number of bolt fastening portions, there can be provided a fixing strength equivalent to the bolt fastening method.

Second Embodiment

Description is given below of a second embodiment using FIG. 5.

In a connector 101 according to this embodiment, a fixing mechanism 103 is constituted of a projection 105 provided on the tubular portion 13 of the mounting member 11 and a groove section 107 formed in the movable portion 17 of the shield shell 9 and engageable by the projection 105.

Here, the same composing parts as the first embodiment are given the same designations and thus the description of the structures and functions thereof are omitted here because they can be referred to the first embodiment. However, effects obtained here are similar to the first embodiment.

Figure 5:
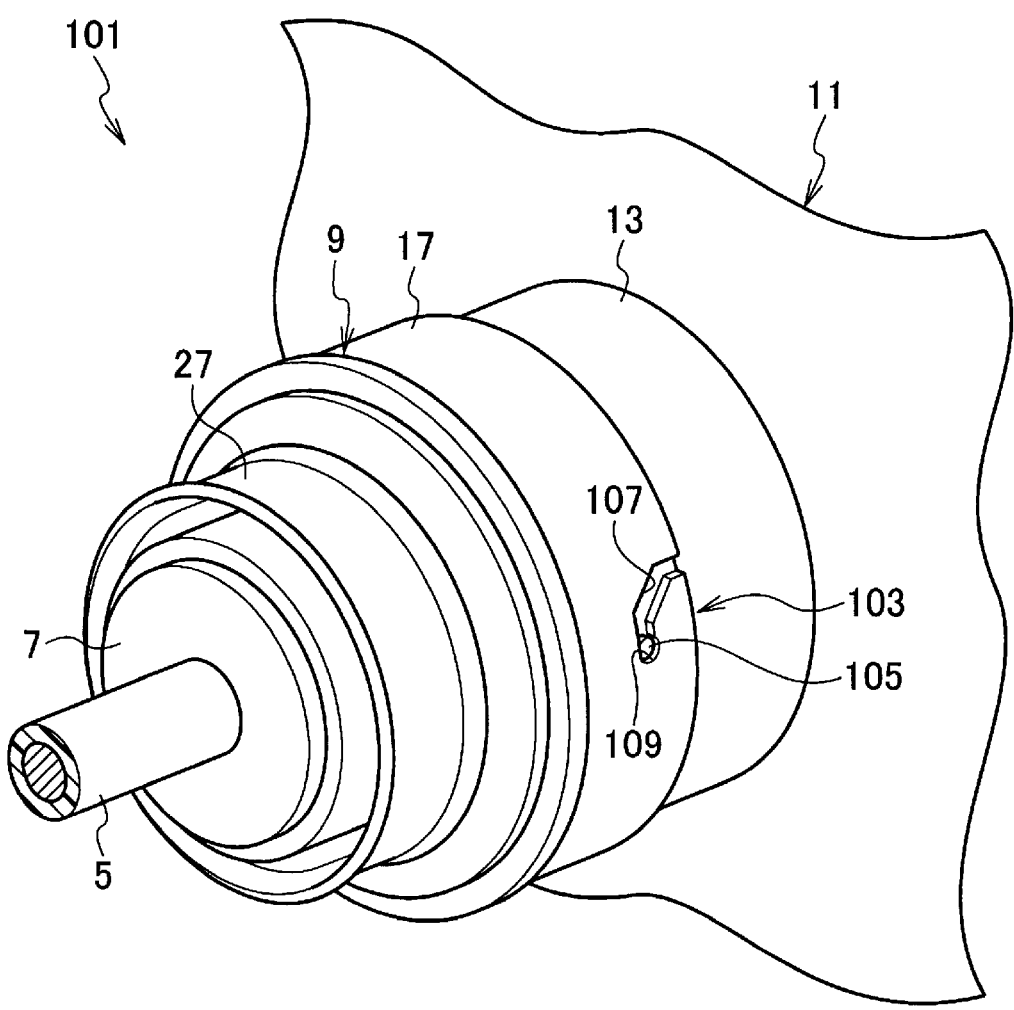
FIG. 5 is a perspective view of a connector according to a second embodiment of the invention.

As shown in FIG. 5, the fixing mechanism 103 is interposed between the tubular portion 13 of the mounting member 11 and the movable portion 17 of the shield shell 9, while it is constituted of the projection 105 provided on the tubular portion 13 of the mounting member 11 and the groove section 107 formed in the movable portion 17 of the shield shell 9 and engageable by the projection 105.

The projection 105 is provided in two places (in FIG. 5, there is shown only one place) at equal intervals in the peripheral direction on the tubular portion 13 of the mounting member 11, while they are projected outwardly from the outer peripheral surface of the tubular portion 13. The projection 105 is inserted into the groove section 107 when the tubular portion 13 is inserted between the movable portion 17 of the shield shell 9 and housing 7 in the diameter direction.

The groove section 107 is formed symmetrically in two places (in FIG. 5, there is shown only one place) at equal intervals in the peripheral direction in the movable portion 17 of the shield shell 9 such that they are inclined relative to the assembling direction of the housing 7 and shield shell 9, while their respective opening ends are formed in correspondence to the projections 105 respectively.

The groove section 107 includes, in its bottom, a recess-shaped engaging section 109 with which, with the housing 7 and shield shell 9 completely assembled to the mounting member 11, that is, with the end face of the tubular portion 13 and the fixing portion 15 existing end face of the housing 7 closely contacted with each other with no clearance between them (see FIG. 3), the projection 105 can be engaged, thereby retaining the housing 7 and shield shell 9.

In this case, the projection 105 is inserted into the groove section 107 from its opening when assembling the housing 7 and shield shell 9. With the projection 105 inserted in the groove section 107, when the tubular portion 13 of the mounting member 11 is inserted between the movable portion 17 of the shield shell 9 and housing 7 in the diameter direction, the projection 105 is moved along the groove section 107 in engagement therewith. With the movement of the projection 105 within the groove section 107, the movable portion 17 of the shield shell 9 is rotated and, with the engagement of the projection 105 into the engaging section 109 of the groove section 107, the housing 7 and shield shell 9 are fixed to the mounting member 11.

In the fixed state provided by the fixing mechanism 103, since the end face of the tubular portion 13 of the mounting member 11 and the fixing portion 15 existing end face of the housing 7 are closely contacted with each other with no clearance between them, there is eliminated the need for provision of a seal member for sealing between the housing 7 and mounting member 11.

In the connector 101, since the fixing mechanism 103 is constituted of the projection 105 provided on the tubular portion 13 of the mounting member 11 and the groove section 107 formed in the movable portion 17 of the shield shell 9 and engageable by the projection 105, while the fixing portion 103 is simplified, the housing 7 and shield shell 9 can be fixed to the mounting member 11.

Here, in the connectors according to the embodiments of the invention, the wire with the terminal provided on its terminal portion is molded into the housing. However, this is not limitative. For example, in a structure where part of the terminal is disposed within the housing as in the connecting portion between the wire and terminal, the part of the terminal may also be molded into the housing.

Also, in the fixing mechanism constituted of the projection and groove section, the projection is provided on the tubular portion of the mounting member and the groove section is formed in the movable portion of the shield shell. However, this is not limitative. For example, the groove section may be formed in the tubular portion of the mounting member and the projection may be provided on the movable portion of the shield shell.

Further, in the fixing mechanism constituted of the projection and groove section, the projection and groove section are respectively formed in two places. However, this is not limitative. For example, they may also be formed in one place or three or more places. Additionally, the shape of the groove section is not limited to the inclined shape but any other shape, for example, an L-like shape can be employed so long as it can fix the housing and shield shell.

In the connector according to the present invention, since the housing is molded integrally with the fixing portion of the shield shell and wire out of insulating resin, there can be reduced a seal member to be interposed between the housing and wire, thereby being able to secure a waterproof property between the housing and wire. Also, a space for arranging the seal member can be reduced, thereby being able to reduce the size of the connector.

Also, between the movable portion of the shield shell and the tubular portion of the mounting member in the diameter direction, there is interposed the fixing mechanism which rotates the movable portion to thereby move the end face of the housing toward the tubular portion and, with the tubular portion and the end face of the housing closely contacted with each other, fixes the housing and shield shell to the mounting member.

Therefore, when fixing the shield shell to the mounting member, a bolt fastening operation using bolts to be provided as separate members can be eliminated, the number of parts can be reduced and the assembling property can be enhanced. Additionally, the space for arranging a tool such as a bolt fastening tool can be reduced, which can further reduce the size of the connector.

Also, since the fixing mechanism fixes the housing and shield shell to the mounting member with the tubular portion and the end face of the housing closely contacted with each other, a seal member to be interposed between the housing and mounting member can be reduced, thereby being able to secure a waterproof property between the housing and mounting member.

Therefore, this connector, due to the molding of the housing and the provision of the fixing mechanism, while securing the waterproof property, can reduce the number of parts, can reduce the size and can enhance the assembling property.

In this connector, since the fixing mechanism is constituted of a screw section, by rotating the movable portion of the shield shell, the housing and shield shell can be fixed to the mounting member, whereby, while reducing the number of bolt fastening places, there can be obtained a fixing strength equivalent to the bolt fastening method.

In this connector, since the fixing mechanism is constituted of the projection provided on any one of the movable portion of the shield shell and the tubular portion of the mounting member and the groove section formed in the other and engageable by the projection, while simplifying the fixing mechanism, the housing and shield shell can be fixed to the mounting member.

In view of the above, the invention can effectively provide a connector which, while securing a waterproof property, can reduce the number of parts, can realize the size reduction and can enhance the assembling property.

What is claimed is:

1. A connector, comprising:
   a housing having a cylindrical shape and configured to insert therein a wire which has a terminal at a terminal portion of the wire;
   a shield shell disposed on an outer peripheral side of the housing;
   a mounting member configured to be assembled with the housing and the shield shell and to set the terminal therein; and
   a fixing mechanism, wherein
   the mounting member includes a tubular portion configured to be inserted into a gap between the housing and the shield shell in a diameter direction of the housing and to be contacted with an end face of the housing,
   the shield shell includes a fixing portion configured to be fixed to the housing, and a movable portion rotatably connected to the fixing portion and disposed on an outer periphery of the tubular portion,
   the housing is molded integrally with the fixing portion and the wire by an insulating resin, and
   the fixing mechanism is provided between the movable portion and the tubular portion in the diameter direction, is configured to move the end face of the housing toward the tubular portion when the movable portion is rotated, and is configured to fix the housing and the shield shell to the mounting member in a state where the tubular portion and the end face of the housing closely contacted with each other.

2. The connector according to claim 1, wherein the fixing mechanism includes a screw portion.

3. The connector according to claim 1, wherein the fixing mechanism includes a projection provided on one of the movable portion and the tubular portion, and a groove section formed in the other one of the movable portion and the tubular portion and configured to be engaged with the projection.

* * * * *